United States Patent
Martone et al.

(10) Patent No.: US 10,079,735 B2
(45) Date of Patent: Sep. 18, 2018

(54) OPTIMIZATION OF WEB PAGE DOWNLOAD DURATION BASED ON RESOURCE KEY PERFORMANCE INDICATOR AND NETWORK PERFORMANCE METRIC

(71) Applicant: Accenture Global Services Limited, Dublin (IE)

(72) Inventors: Pietro Martone, Rome (IT); Georgios Passalis, Vrillissia (GR); Emanuele Procaccioli, Rome (IT)

(73) Assignee: Accenture Global Services Limited, Dublin (IE)

( * ) Notice: Subject to any disclaimer, the term of this patent is extended or adjusted under 35 U.S.C. 154(b) by 287 days.

(21) Appl. No.: 15/101,843

(22) PCT Filed: Dec. 4, 2014

(86) PCT No.: PCT/EP2014/076624
§ 371 (c)(1),
(2) Date: Jun. 3, 2016

(87) PCT Pub. No.: WO2015/082637
PCT Pub. Date: Jun. 11, 2015

(65) Prior Publication Data
US 2016/0308735 A1     Oct. 20, 2016

(30) Foreign Application Priority Data
Dec. 5, 2013   (EP) .................................... 13005669

(51) Int. Cl.
*H04L 12/24* (2006.01)
*G06F 11/34* (2006.01)
*G06F 17/30* (2006.01)

(52) U.S. Cl.
CPC ........ *H04L 41/5009* (2013.01); *G06F 11/349* (2013.01); *G06F 11/3419* (2013.01);
(Continued)

(58) Field of Classification Search
CPC ............. H04L 41/5009; H04L 41/5083; H04L 63/102; G06F 11/3452; G06F 11/349;
(Continued)

(56) References Cited

U.S. PATENT DOCUMENTS

2005/0216421 A1* 9/2005 Barry .................. G06F 11/0709
705/64
2005/0262104 A1 11/2005 Robertson et al.
(Continued)

FOREIGN PATENT DOCUMENTS

EP        1 549 092 A1    6/2005
WO    WO 2004/097645 A1    11/2004

OTHER PUBLICATIONS

Liberal et al. "Application of General Perception-Based QoS Model to Find Providers' Responsibilities. Case Study: User Perceived Web Service Performance," Oct. 28, 2005, 6 pages.
(Continued)

*Primary Examiner* — Le H Luu
(74) *Attorney, Agent, or Firm* — Harrity & Harrity, LLP

(57) ABSTRACT

Summarizing, the application relates to a network server system, a computer program product and a computer-implemented method for an efficient determination of one or more web page KPIs from a client device via a network, for an efficient determination of a correlation value of the derived resource KPIs and a predetermined network performance metric and for enabling an optimization of the web page download duration based on the determined correlation value. In particular the application relates to a network server system, a computer program product, and a computer
(Continued)

implemented method suitable for down-load time determination and optimization.

20 Claims, 9 Drawing Sheets

(52) U.S. Cl.
CPC .... G06F 11/3452 (2013.01); G06F 17/30905 (2013.01); H04L 41/5083 (2013.01); *G06F 11/3409* (2013.01); *G06F 11/3495* (2013.01); *G06F 2201/875* (2013.01)

(58) Field of Classification Search
CPC ............. G06F 11/3419; G06F 11/3409; G06F 11/3495; G06F 17/30905; G06F 2201/875; G06F 11/0709; G06F 21/6218; G06F 8/60; G06F 9/5072; G06Q 10/067; H04M 3/5191; H04N 21/26216; H04W 4/70
See application file for complete search history.

(56) References Cited

U.S. PATENT DOCUMENTS

| | | | |
|---|---|---|---|
| 2007/0136579 A1* | 6/2007 | Levy | H04L 63/102 713/168 |
| 2008/0235761 A1* | 9/2008 | Avram | G06F 21/6218 726/1 |
| 2012/0069131 A1* | 3/2012 | Abelow | G06Q 10/067 348/14.01 |
| 2012/0192080 A1 | 7/2012 | Lloyd | |
| 2012/0214601 A1* | 8/2012 | Ruppert | G06F 8/60 463/42 |
| 2013/0080516 A1* | 3/2013 | Bologh | H04N 21/26216 709/203 |
| 2013/0136253 A1* | 5/2013 | Liberman Ben-Ami | H04M 3/5191 379/265.09 |
| 2013/0166738 A1 | 6/2013 | Ivershen | |
| 2013/0290493 A1* | 10/2013 | Oyman | H04W 4/70 709/219 |
| 2014/0108792 A1* | 4/2014 | Borzycki | G06F 21/6218 713/165 |
| 2015/0067171 A1* | 3/2015 | Yum | G06F 9/5072 709/226 |

OTHER PUBLICATIONS

Written Opinion of the International Searching Authority corresponding to PCT/EP2014/076624, dated Apr. 13, 2015, 7 pages.

* cited by examiner

| 210 | collect data records |
|---|---|
| 220 | generate a time series of collected data records |
| 230 | apply a filter on the generated time series to identify a resource downoad event |
| 240 | determine resource KPIs for the resource download event |
| 250 | determine a correlation value for the resource download event |

| Variable Name | Min | Median | Mean | Max | Std. Deviation | PCTL_P10 | PCTL_P20 | PCTL_P30 | PCTL_P40 | Pctl_P80 | Pctl_P90 | Pctl_P95 | Pctl_P99 |
|---|---|---|---|---|---|---|---|---|---|---|---|---|---|
| Throughput Download (mbps) | - | 0.22 | 0.57 | 713.14 | 4.76 | 0.02 | 0.03 | 0.04 | 0.16 | 0.51 | 0.88 | 1.26 | 4.11 |
| Throughput Upload (mbps) | -0.16 | 0.07 | 0.09 | 4.71 | 0.06 | 0.01 | 0.04 | 0.01 | 0.07 | 0.09 | 0.11 | 0.19 | 0.29 |
| No. of Objects | 3.00 | 12.04 | 37.90 | 100,408.00 | 393.72 | 2.00 | 4.00 | 4.00 | 6.02 | 43.00 | 76.00 | 132.00 | 310.00 |
| Loading Time (sec) | 0.01 | 5.12 | 13.19 | 2,450.18 | 31.07 | 0.74 | 1.75 | 1.61 | 4.38 | 17.75 | 33.90 | 37.83 | 83.14 |
| Mega Bytes Download | - | 0.09 | 0.66 | 886.84 | 4.34 | 0.00 | 0.03 | 0.04 | 0.07 | 0.44 | 1.06 | 2.03 | 8.58 |
| Mega Bytes Upload | 0.00 | 0.03 | 0.05 | 34.62 | 0.16 | 0.00 | 0.04 | 0.02 | 0.03 | 0.03 | 0.02 | 0.07 | 0.27 |

Fig. 4

| Referer | No. of groups | No. of Objects | Obj/ Groups | Mean Loading Time | Avg. bytes Download | Avg. bytes upload | Avg. Throughput Download | Avg. Throughput Upload | Users |
|---|---|---|---|---|---|---|---|---|---|
| www.example1.com | 11,743 | 466,573 | 43 | 13 | 882,453 | 34,301 | 0.46 | 0.04 | 674 |
| www.example2.com | 4,689 | 228,7645 | 42 | 11 | 639,912 | 33,064 | 0.50 | 0.06 | 386 |
| www.example3.com | 2,801 | 149,4063 | 59 | 10 | 624,093 | 33,713 | 0.52 | 0.08 | 344 |
| www.example4.com | 34 | 106,755 | 3,052 | 245 | 28,449,695 | 1,213,087 | 0.63 | 0.03 | 2 |
| www.example5.com | 3,876 | 94,583 | 23 | 136 | 326,113 | 20,643 | 0.43 | 0.07 | 292 |
| www.example6.com | 506 | 22,524 | 46 | 13 | 1,564,891 | 31,414 | 0.53 | 0.05 | 36 |
| www.example7.com | 86 | 22,429 | 253 | 11 | 1,904,023 | 153,869 | 0.61 | 0.09 | 4 |
| | 145 | 20,319 | 132 | 13 | 846,635 | 98,663 | 0.52 | 0.12 | 15 |
| | 1,218 | 19,154 | 14 | 17 | 977,483 | 14,970 | 0.73 | 0.06 | 98 |
| | 36 | 15,542 | 453 | 13 | 5,522,833 | 201,403 | 2.83 | 0.11 | 1 |
| | 431 | 15,357 | 34 | 16 | 624,534 | 30,181 | 0.33 | 0.06 | 40 |
| | 979 | 15,314 | 15 | 9 | 200,383 | 9,747 | 0.11 | 0.08 | 94 |
| | 421 | 15,172 | 34 | 15 | 894,635 | 26,416 | 0.53 | 0.07 | 34 |
| | 842 | 14,453 | 15 | 10 | 233,311 | 13,973 | 0.32 | 0.06 | 76 |
| | 139 | 14,3184 | 75 | 13 | 861,641 | 53,002 | 0.26 | 0.04 | 1 |
| | 385 | 13,192 | 36 | 16 | 1,205,966 | 27,733 | 0.63 | 0.04 | 16 |
| | 247 | 13,083 | 54 | 14 | 627,943 | 40,883 | 0.43 | 0.09 | 14 |
| | 612 | 12,696 | 22 | 21 | 3,132,919 | 15,491 | 3.29 | 0.08 | 62 |
| | 293 | 11,959 | 42 | 15 | 674,992 | 28,686 | 0.36 | 0.05 | 22 |
| | 153 | 6,603 | 445 | 8 | 466,478 | 37,324 | 0.53 | 0.13 | 25 |

Fig. 6

OPTIMIZATION OF WEB PAGE DOWNLOAD DURATION BASED ON RESOURCE KEY PERFORMANCE INDICATOR AND NETWORK PERFORMANCE METRIC

RELATED APPLICATION

This application claims priority to PCT Application No. PCT/EP2014/076624, filed Dec. 4, 2014, which claims priority to European Patent Application No. 13005669.0 filed on Dec. 5, 2013, which are incorporated herein by reference.

TECHNICAL FIELD

The following description relates to an efficient determination of web page download duration to a client device via a network, to an efficient determination of a correlation value of a derived resource download KPI, e.g. a web page download duration, and a predetermined network performance metric, and to enabling an optimization of the web page download KPI, e.g. the web page download duration based on the determined correlation value. In particular, the description relates to a network server system, a computer program product, and a computer-implemented method suitable for download time determination and optimization.

BACKGROUND

In order to provide an adaptation of resources, e.g. web pages, to specific requirements of existing networks comprising mobile networks, many operators of web sites provide different web pages, e.g. separate mobile web pages designed to account for the lower data throughput available via a mobile network and the somewhat limited size of screens of mobile devices that are predominantly utilized for web browsing over a mobile network. Accordingly, it is desirable to identify further possibilities of optimizations of web pages to be downloaded via networks, e.g. via mobile networks.

TECHNICAL DEFINITIONS

A mobile network may be implemented as a group of interconnected computers and/or mobile devices at least one of which communicates wirelessly, e.g. via a cellular network or a telecommunication data network, with one or more of the remaining devices of the network.

A client device may refer to any computing device capable of wireless communication. Examples of such client devices are mobile devices such as smart phones, mobile phones, personal digital systems, tablet PC's, pagers as well as other electronic devices that can connect and/or are connected to a mobile network and can be used to transmit and receive data. A client device may communicate wirelessly using local area technologies, such as wireless fidelity (WiFi), or wide area wireless technologies, such as global system for mobile communication (GSM), general package radio service (GPRS), enhanced data rates for global evolution (AT), universal mobile telecommunication system (UMTS), high speed downloading/uplink packet access (HSDPA; HSUPA), long term evolution (LTE), or worldwide interoperability for microwave access (WIMAX). Other suitable communication technologies available today or in the future are also possible.

A resource may refer to a web page that is accessible from a client device using a uniform resource identifier (URI) over a network. A resource may comprise one or more related objects.

An object relates to any type of objects that is part of a resource. In particular, each object can relate to the layout of the resource (for example cascading style sheets (CSS)) modules, templates) or to the content of the resource (images, text videos, comprising all possible types applicable for being provided as part of a resource, e.g. GIF, JPEG, PNG, TIFF, EPS and PDF images).

A resource download event relates to a download of all objects of a resource via a network. In other words, a resource download event comprises downloading all objects of which the resource is comprised.

A median filter is a non-linear digital filtering technique to perform noise reduction on an image or signal. The median filter is applied in order to process the signal entry by entry and replace each entry with the median of neighboring entries.

ASPECTS OF THE INVENTION

According to an aspect of the invention, a network server system is utilized for optimizing a resource that is provided to be downloaded by a client device via a network. The network server system comprises a collecting unit for collecting a plurality of data records. Each data record relates to an object downloaded to the client device. In particular, for each object downloaded to the client device, a data record may be generated that is collected by the collecting unit. The network server system is further operable to generate, by a time series unit, a time series of the collected data records. In addition, the network server system is operable to apply, by a filter unit, a filter on the generated time series in order to identify a resource download event. The resource download event corresponds to downloading the resource. In particular, since a resource may comprise one or more objects, it is necessary to download all objects comprised by the resource when downloading the resource. Accordingly, the resource download event corresponds to or comprises all data records generated for all objects that compose the downloaded resource. In addition, the network server system is operable to determine, by a key performance indicator (KPI) determination unit, a resource KPI for the resource download event. Further, the network server system is operable to determine via a correlation value determination unit a correlation value for the derived resource download duration and a predetermined network performance metric. The determined correlation value is utilizable to provide for an optimization of the resource and/or to perform an optimization of the resource.

Advantageously, one or more data records corresponding to a resource can be identified without having any indication of which one of the one or more data records correspond(s) to the resource. In other words, although there is no indication as to which data records belong to a resource, these data records can be identified. Moreover, a determination can be made as to when the collecting unit has downloaded all resource events—respectively objects corresponding to the resource events—of a resource.

The network server system may be located at a host of the resource that is to be downloaded via the network. Alternatively, the network server system may be located at a provider of the network, e.g. at a provider of a mobile network, in order to determine the performance of the network.

The predetermined network performance metric may comprise mobile quality of services (QoS) to control the performance reliability and usability of the mobile network. Accordingly, the predetermined network performance metric may comprise standard quality of services such as the "coverage" metric which may correspond to the strength of the signal that is measured using a test equipment and that can be utilized for estimating a size of a cell in the mobile network. Another metric may be the "accessibility" metric comprising the determination of an ability of a mobile network to handle successful calls from mobile networks to fixed networks and from mobile networks to mobile networks. Determining the correlation value may comprise determining the value by utilizing a lookup table comprising pre-calculated values for a plurality of pre-determined metrics. Alternatively, determining the correlation value may comprise calculating the correlation value for the derived resource and the predetermined network performance metric.

Accordingly, it is desirable to efficiently determine KPIs related with downloading of web pages from client devices such as laptops, mobile phones or other handheld devices, via a network in order to enable for an optimization of page download time. In particular, KPIs may include, but are not limited to a download duration of web pages from client devices. In particular, it is desirable to efficiently identify the KPIs, associated with downloading a web page via a mobile network, wherein the identification is based on a sequence of the events associated with web browsing (also referred herein as hypertext transfer protocol (HTTP) browsing) via the network.

One of the main challenges is the identification of the resource download events each associated with a web page downloaded during the web browsing, e.g. by visiting a plurality of web pages of a web site within an HTTP-session or by visiting a plurality of web sites via uniform resource locators (URLs). A web page can be referred to as a resource. Each resource comprises one or more objects of different object types, e.g. cascading style sheets (CSS), images (e.g. JPEG) or text (e.g. HTML). When downloading a resource, each of the objects associated with the resource generates a data record (also referred herein as an event). It is further desirable to determine based on among other things the KPIs associated with downloading the resource in correlation with any pre-determined network metric whether an optimization of the web page to be downloaded via a network is necessary and/or possible. Based on such a determination, optimization of the web page can be initiated.

In other words, the above described network server system enables the determination of a correlation value in order to provide for an optimization of the resource based on real time data. To do so, data records associated with objects that are part of a resource that is downloaded on the client device via a network are collected. The data records may then be transmitted from the client device to the network server system. On the collected data units, a filter is applied in order to identify a resource download event corresponding to the resource on the plurality of downloaded objects of the time series or, in other words, in order to identify the data units that correspond to the objects of the resource. For this resource download event, one or more resource KPIs are determined. Based on the determined resource KPIs and the predetermined network performance metric, a correlation value is calculated which enables a user to determine whether the resource can be optimized or not. Accordingly, a provider and/or an owner of the web site and/or a network provider is able to determine whether a resource that is made available to download via a network can be optimized or not, based on the correlation value between the derived resource KPIs and the predetermined network performance metric. The predetermined network performance metric may also be referred to as network KPIs and may comprise one or more of the following: available uplink quality, a size of the objects comprised by a resource corresponding to a resource download event, available bandwidth at a download time of the objects of the resource corresponding to the resource download event, a number of objects comprised by the resource download event, a channel quality indicator (CQI) per class, maximum channel elements, used channel elements, maximum users per cell, average users per cell, transmitted power, received total wideband power (RTWP), GPRS average throughput, HSDPA average throughput, maximum channel elements in downlink and uplink, used channel elements in downlink and uplink, maximum users per cell and average users per cell. Taking the predetermined network performance metric into account further enables e.g. an owner of the resource and/or a host of the resource and/or the provider of the network to identify a performance level of a resource that is to be downloaded via the network taking varying network quality parameters into account, such that the determined correlation value provides a detailed determination of the performance of the resource.

Optionally, collecting the data records may be performed on the client device, e.g., by application software running on that device. The client device may then transmit the collected data records to the network server system. Optionally, generating the time series of the collected data records may be performed on the client device. The client device may then transmit the generated time series to the network server system. Optionally, applying the filter on the generated time series, as outlined above, may be performed on the client device. The result of applying the filter on the time series may be then transmitted to the network server system. Optionally, determining the resource download event may be performed on the client device. The determined resource download event may then be transmitted to the network server system. Optionally, determining the resource KPIs may be performed on the client device. The determined resource KPIs may then be transmitted to the network server system.

According to a preferred embodiment of the network server system, the network may be a mobile network.

According to a preferred embodiment of the network server system, determining the KPIs by the key performance indicator determination unit may comprise determining a resource download event. In other words, resource KPIs may comprise a resource download event. In other words, the key performance determination unit may determine the period of time that it takes for all objects of the resource to be downloaded on the client device via the network. In particular, it is desirable to determine the required download duration of a web page via a network, wherein the identification is based on a sequence of the events associated with web browsing (also referred herein as hypertext transfer protocol (HTTP) browsing) via the network. Moreover, standard statistical correlation formulae may be applied in order to identify correlation values among all possible combinations of resource KPIs and a predetermined network performance metric, also referred to as network KPIs. The predetermined network metric (network KPIs) may comprise, but are not limited to, one or more of: available uplink quality, a size of the objects comprised by a resource corresponding to a resource download event, available bandwidth at a download time of the objects of the resource corresponding to the resource download event, a number of objects comprised by the resource download event, a channel quality indicator (CQI) per class, maximum channel elements, used channel elements, maximum users per cell, average users per cell, transmitted power, received total wideband power (RTWP), GPRS average throughput, HSDPA average throughput, maximum channel elements in downlink and uplink, used channel elements in downlink and uplink, maximum users per cell and average users per cell. For example, the standard statistical correlation formulae may be utilized to identify correlation among a required download duration of a web page and one or more of the predetermined network metrics (network KPIs).

According to a preferred embodiment of the network server system, the plurality of data records relates to a plurality of resources wherein each data record corresponds to an object that is part of one of the plurality of resources. In other words, each object may correspond to one of the plurality of resources but the objects themselves may be downloaded from a plurality of resources. The term "corresponds" may include "is owned by" or "is part of". In other words, the same object may be a part of multiple resources. In addition, the filter is applicable to identify a plurality of resource download events, wherein each resource download event corresponds to one of the plurality of resources. The term "corresponds" may include "relates to" or "is identified for". In other words, for each of the resources that is downloaded on the client device, a matching resource download event is identified. In addition, for each of the resource download events, one or more resource KPIs are determined by the KPI determination unit. Moreover, for each resource download event of each resource, a correlation value of the resource KPI and the predetermined network performance metric is determined by the correlation value determination unit. The determined correlation value is utilizable to initiate an optimization of said resource. In other words, based on the resource KPIs and the predetermined network performance metric corresponding to a resource, the correlation value is determined. The correlation value that is utilizable to optimize this resource is determined.

Accordingly, the above features enable a user to determine for a plurality of resources that are downloaded on a client device via a network, which of the downloaded objects are part of which resource or which of the downloaded objects belong to which resource. This determination allows for a further determination and/or calculation of a correlation value for each of the identified resources in order to determine which of the downloaded resources are to be optimized.

According to a preferred embodiment of the network server system, determining and/or calculating the correlation value further comprises performing a correlation analysis between a resource KPI, e.g. between a download time duration, and one or more predetermined network metrics, also referred to as network KPIs, wherein a predetermined network metric may comprise one or more of: available uplink quality, a size of the objects comprised by a resource corresponding to a resource download event, available bandwidth at a download time of the objects of the resource corresponding to the resource download event, a number of objects comprised by the resource download event, available uplink quality, a size of the resource download event, available bandwidth at a download time of the resource download event, a number of objects comprised by the resource download event. The available uplink quality may be provided e.g. in kbit/s or Mbit/s (or other metric of upload speed over time). The size of the objects may be provided e.g. in Kbytes or Mbytes (or other metric of data size). The available bandwidth at the download time may relate to the available downlink quality and may be provided e.g. in kbit/s or Mbit/s (or other metric of download speed over time). Determining and/or calculating the correlation value may further comprise applying standard statistical correlation formulate to identify correlation values among any possible combination between any resource KPI and any network KPI.

According to a preferred embodiment of the network server system, each resource is a web page.

According to a preferred embodiment of the network server system, each object relates to either a layout of the resource or to a content of the resource. The layout of the resource may comprise one or more of cascading style sheets (CSS), modules, and templates. The content of the resource may comprise one or more of images of different formats (e.g. GIF, JPEG, PNG, TIFF, IPS, and PDF), videos of different formats (e.g. FLV, OGG, or MP4), and text of different formats.

According to a preferred embodiment of the network server system, the resource download event comprises downloading all objects comprised by the resource. In other words, the resource download event comprises downloading all objects that are all part of the resource.

According to a preferred embodiment of the network server system, each data record comprises one or more of: a download time of the object, an object type definition of the downloaded object, a uniform resource identifier (URI), and an international mobile equipment identity (IMEI) of the client device. Optionally, each data record may further comprise a session ID associated with the resource the object is downloaded from and/or an HTTP-cookie associated with the resource the object is downloaded from. The download time may correspond to the point in time at which that object has been downloaded to the client device. The URI may have been invoked by the client device for initiating the download of the resource corresponding to the resource download event.

According to a preferred embodiment of the network server system, upon collecting information, the network server system is further operable to perform data cleansing. Data cleansing may comprise excluding collected data records with missing IMEIs. Data cleansing may also comprise removing a prefix "http://" from a URI field of collected data records, or extracting a portion of the URI field from collected data records.

According to a preferred embodiment of the network server system, collecting data records comprises recording, at a pre-determined time interval of 1 second (s) each, the number of objects downloaded by the client device. It is noted that collecting data records could further comprise recording for any predetermined time interval, which may be e.g. a time interval of ¼ s, ½ s, or 2 s, the number of objects downloaded by the client device. Application of the filter accordingly results in the creation of groups related to continuous activity, while the remaining activity is suppressed. Each of these groups determined to contain continuous activity is associated with a resource download event, which itself corresponds to downloading of exactly one resource. In another embodiment, a resource download event may correspond to downloading of two or more resources. In the case that a resource download event corresponds to downloading of more than one resource, the group may be de-composed into the resources using a session ID and/or an HTTP cookie.

According to a preferred embodiment of the network server system, filtering the time series comprises applying a median filter with kernel=5 on the time series. Applying the median filter with kernel=5 is based on the filtering assumption that activity which corresponds to web page loading is expected to have a minimum duration whereas remaining activity is attributed to page refreshers or other user actions on the time series.

The above features lead to the technical effect that the optimization of the resource is based on a correlation of a resource KPI, e.g. a duration of downloading objects comprised by resource and a plurality of predetermined parameters that may comprise the available uplink quality taking into account packet loss. The available uplink quality may be provided, e.g., as packet delay variation (PDV), wherein PDV is a difference in end-to-end one-way-delay between selected packets in a flow with any lost packets being ignored. The predetermined parameters may further comprise a size of the resource download event which may be equivalent with a size of objects comprised by a resource associated with the resource download event. The predetermined parameters may further comprise an available uplink and downlink bandwidth at the point in time the objects of the resource are being downloaded and on the number of objects comprised by the resource corresponding to the resource download event.

Accordingly, the optimization of the resource is based on real-time data, taking into account further factors of the underlying network such that the determination of whether to optimize the resource or not is based on a plurality of technical considerations. In particular, one or more data records corresponding to a resource can be identified without having any indication of which one of the one or more data records correspond(s) to the resource. In other words, although there is no indication as to which data records belong to a resource, these data records can be identified. Moreover, a determination can be made as to when all resource events—respectively objects corresponding to the resource events—of a resource have been downloaded.

Accordingly, this approach renders it possible to compare a plurality of resources, all comprising a different number of varying objects having varying size(s). This overcomes a technical problem of earlier techniques that require data about the resources to be known in advance.

Deriving the resource KPIs and determining and/or calculating the correlation value may be reduced to a primary resource, wherein the primary resource is a resource of a plurality of resources comprising the maximum number of objects, wherein the plurality of resources are all part of a web site. In other words, considering a web site comprising a plurality of web pages, the primary resource is one web page of the plurality of web pages of the web site, where the primary resource is the one web page comprising the maximum number of objects. Moreover, determining and/or calculating the correlation value may comprise calculating the downloading time of the resource, wherein the downloading time may be the point in time the resource is being downloaded.

Determining and/or calculating the correlation value may further comprise determining all objects of each resource being downloaded by the client device over the network, and for each resource decomposing the objects of the resource into corresponding object types. Determining all objects of each resource may comprise parsing a log file of the network server system.

Accordingly, the point in time at which a resource is being downloaded as well as the object types a resource comprises may be further included into the determination as to whether a resource is to be optimized.

According to an aspect, the invention relates to a client device for providing pre-processing for a network server system for optimizing a resource to be downloaded via a network. Optionally, the network may be a mobile network. The client device is operable to collect a plurality of data records, wherein each data record relates to an object downloaded to the client device. The client device is optionally further operable to send the plurality of data records to the network server system. Optionally, the client device is operable to generate a time series of the data records collected and to apply a filter on the time series to identify a resource KPI, e.g. a resource download event, wherein the resource KPI corresponds to downloading the resource. Optionally, the client device is operable to determine a resource download duration for the resource download event and to send the resource download duration to the network server system.

Accordingly, the network server system is optionally operable to receive the collected data records from the client device. The network server system is optionally operable to receive the generated time series from the client device. The network server system is optionally operable to receive the identified resource download event from the client device. The network server system is optionally operable to receive the determined resource KPI(s) from the client device.

According to an aspect, the invention relates to a computer-implemented method for optimizing a resource to be downloaded by a client device via a network. The method may comprise collecting a plurality of data records, wherein each data record relates to an object downloaded to the client device. The method may further comprise generating a time series of the data records collected and applying a filter on the time series in order to identify the resource download event, wherein the resource download event corresponds to downloading the resource. In addition, the method may comprise the step of determining a resource KPI for the resource download event and determining a correlation value of the derived resource KPI and a predetermined network performance metric. The predetermined network metric may comprise one or more of the following: available uplink quality, a size of the objects comprised by a resource corresponding to a resource download event, available bandwidth at a download time of the objects of the resource corresponding to the resource download event, a number of objects comprised by the resource download event, a channel quality indicator (CQI) per class, maximum channel elements, used channel elements, maximum users per cell, average users per cell, transmitted power, received total wideband power (RTWP), GPRS average throughput, HSDPA average throughput, maximum channel elements in downlink and uplink, used channel elements in downlink and uplink, maximum users per cell and average users per cell The determined correlation value may be utilizable to perform an optimization of the resource.

According to a preferred embodiment of the method, the network may be a mobile network.

According to a preferred embodiment of the method, determining the KPIs may comprise determining a resource download event. In other words, resource KPIs may comprise a resource download event. In other words, the period of time that it takes for all objects of the resource to be downloaded on the client device via the mobile network may be determined.

According to a preferred embodiment, the method may further comprise that the plurality of data records relates to a plurality of resources, wherein each data record corresponds to an object that is comprised by one of the plurality of resources. Moreover, the method may further comprise that the filter is applicable for identifying a plurality of resource download events, wherein each of the resource download events corresponds to one of the plurality of resources. Moreover, for each of the resource download events, one or more resource KPIs may be determined. The method may further comprise determining a correlation value for the resource KPIs and the predetermined network performance metric for each of the plurality of resource download events, wherein the determined correlation value is utilizable to perform an optimization of the resource for which the correlation value has been determined.

According to a preferred embodiment of the computer-implemented method, each resource may be a web page.

According to a preferred embodiment of the computer-implemented method, each object may relate to either a layout of the resource comprising cascading style sheets (CSS), modules, and templates or to a content of the resource comprising images of different formats, videos of different formats, and text of different formats.

According to a preferred embodiment of the computer-implemented method, the resource download event may comprise downloading all objects comprised by the resource.

According to a preferred embodiment of the computer-implemented method, each data record may comprise one or more of the following: a download time of the object, an object type definition of the object, a uniform resource identifier (URI) invoked by the client device for initiating the resource download event and an international mobile equipment identity (IMEI) of the client device. Optionally, each data record may further comprise a session ID associated with the resource the object is downloaded from and/or an HTTP-cookie associated with the resource the object is downloaded from.

According to a preferred embodiment of the computer-implemented method, collecting download information may comprise recording for each second the number of objects downloaded by the client device.

According to a preferred embodiment, the method may further include that filtering the time series comprises applying a median filter with kernel=5 on the time series.

According to a preferred embodiment of the computer-implemented method, the calculation of the correlation value may comprise performing a correlation analysis between the a resource KPI, e.g. a resource download duration and one or more of the following parameters, which may also be referred to as network KPIs: available uplink quality, a size of the resource download event, available bandwidth at a download time of the resource download event, a number of objects comprised by the resource download event, a channel quality indicator (CQI) per class, maximum channel elements, used channel elements, maximum users per cell, average users per cell, transmitted power, received total wideband power (RTWP), GPRS average throughput, HSDPA average throughput, maximum channel elements in downlink and uplink, used channel elements in downlink and uplink, maximum users per cell and average users per cell.

An aspect of the invention relates to a computer program product comprising computer readable instructions, which, when loaded and executed on a network server system, cause the network server system to perform method steps according to the computer implemented method as outlined above.

An aspect of the invention relates to a method for identifying resource download events on a telecommunications network in order to optimize corresponding resources. The method may comprise collecting information comprising browsing data for one or more objects corresponding to a resource. In addition, the method may comprise deriving a time series for the objects collected. Moreover, the method may comprise filtering the derived time series to identify resource download events, where each resource download events corresponds to the downloading of a given resource. Moreover, the method may comprise deriving, for each resource download event, quality of experience metrics and correlating the quality of experience metrics with network performance metrics. Finally, the method may comprise optimizing the resources based on the derived correlation.

An aspect of the invention relates to a network server system (100) comprising instructions which when executed cause the network server system to perform the method for identifying resource download events on the telecommunications network as outlined above.

An aspect of the invention relates to a computer program product comprising computer readable instructions which, when loaded and executed on a network server system, cause the network server system to perform the method for identifying resource download events on the telecommunications network as outlined above.

It should be understood that various modifications to the aspects/embodiments/examples may be made without deviating from the invention, in particular one or more elements of the aspects/embodiments/examples may be isolated from the corresponding aspects/embodiments/examples and may be combined and used in other aspects/embodiments/examples to form new examples.

BRIEF DESCRIPTION OF THE FIGURES

In the following, a detailed description of examples will be given with references to the figures.

Exemplary aspects and/or preferred embodiments are described in relation to FIGS. 1 to 9, wherein

FIG. 2 shows the method steps suitable for the determination of a correlation value in order to perform an optimization of a resource.

FIG. 4 shows exemplary correlation values determined by the correlation value determination unit of the network server system.

FIG. 6 shows an exemplary visualization of correlation values determined by the correlation value determination unit of the network server system for a plurality of resource download events, wherein each row in the table corresponds to a different resource download event.

DETAILED DESCRIPTION OF THE FIGURES

Figure 1:
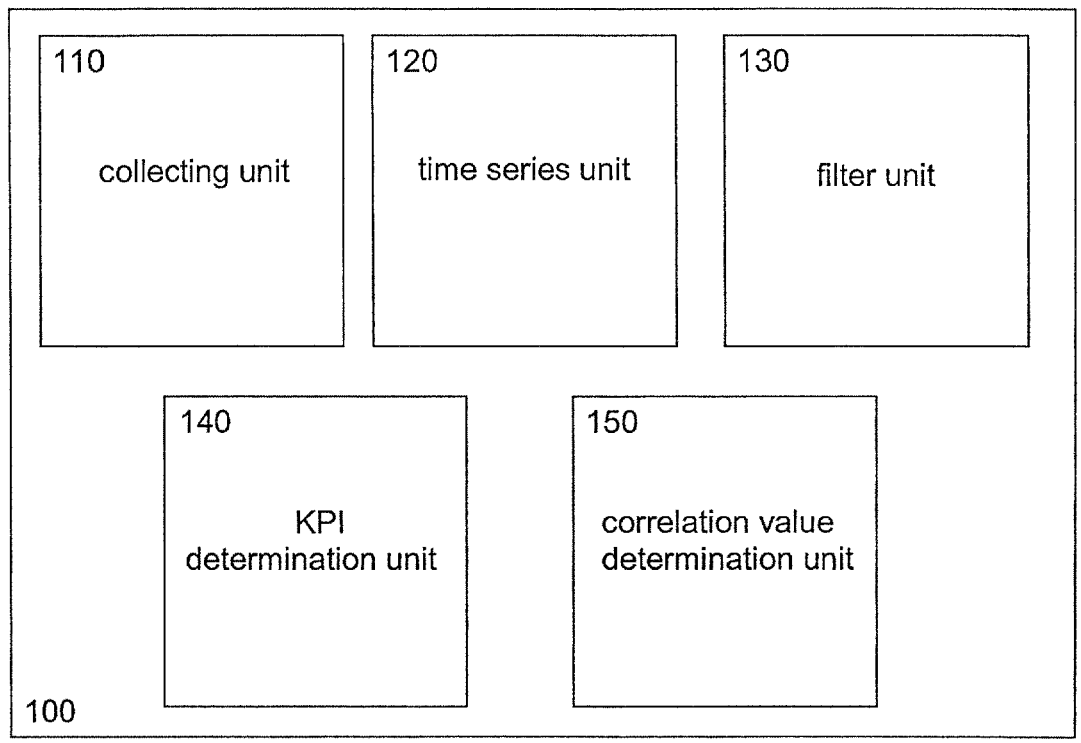
FIG. 1 shows an example of a network server system suitable for optimizing a resource to be downloaded by a client device via a network.

FIG. 1 shows a network server system suitable for determining a correlation value according to the method of FIG. 2, wherein the correlation value is utilizable to perform an optimization of a resource. The network server system (100) comprises a collecting unit (110), a time series unit (120), a filter unit (130), a KPI determination unit (140), and a correlation value determination unit (150). The units the network server system is composed of may be implemented into separate hardware units. In another embodiment, the units of the network server system may all be implemented on the same hardware platform.

The collecting unit (110), which may optionally be part of the client device rather than of the network server system, is suitable for collecting (210) a plurality of data records. Each data record may relate to an object that is downloaded to a client device. Each of the data records may relate to an object. Each object may be comprised by a resource. The client device may download a plurality of resources, each resource comprising a plurality of objects, wherein for each object, a data record is generated and collected by the collecting unit (110). Accordingly, the plurality of data records may relate to a plurality of resources, wherein a resource may be a web page. In other words, the plurality of data records may relate to a plurality of data records generated from a plurality of web pages, such that each data record corresponds to an object that is comprised in one of the plurality of web pages. Accordingly, one resource is composed of objects that do not compose any other resource. Each object may relate either to a layout of the resource comprising the object, such that the object may be e.g. cascading style sheet (CSS), a module or a template. In addition, each object may relate to and/or contain content of the resource, such that the object may be e.g. an image of any format (e.g. JPEG, PNG, TIFF, EPS or PDF), a video of any format (e.g. e.g. FLV, OGG or MP4), or a text of any format. In one example, collecting data records may comprise collecting all objects of all web pages which a client device downloads via a mobile network within a predefined time period. Each data record may comprise a download time of the object, and/or an object type definition of the object, and/or a uniform resource identifier (URI) invoked by the client device for initiating the resource download event, and/or an international mobile equipment identity (IMEI) of the client device. Optionally, each data record may further comprise a session ID associated with the resource the object is downloaded from and/or an HTTP-cookie associated with the resource the object is downloaded from. Advantageously, one or more data records corresponding to a resource can be identified without having any indication of which one of the one or more data records correspond(s) to the resource. In other words, although there is no indication as to which data records belong to a resource, these data records can be identified. Moreover, a determination can be made as to when the collecting unit (110) has downloaded all resource events—respectively objects corresponding to the resource events—of a resource.

The collecting unit (110) may optionally further perform data cleansing on the data records collected, wherein the data cleansing may comprise excluding collected data records that do not comprise an IMEI and/or removing a prefix "http://" from a URI field of a collected data record and/or stripping out a certain portion of the URI such as the domain or hostname. In an example, the collecting unit (110) may further record, for each second or for any other predetermined time interval, the number of objects downloaded by the client device.

The time series unit (120), which may optionally be part of the client device rather than of the network server system, is suitable for generating (220) a time series of the collected data records. An exemplary time series generated from collected data records corresponding to objects of a plurality of resources is provided in FIG. 3. Generating the time series may optionally comprise recording, for each second, a number of objects downloaded by the client device.

Figure 3:
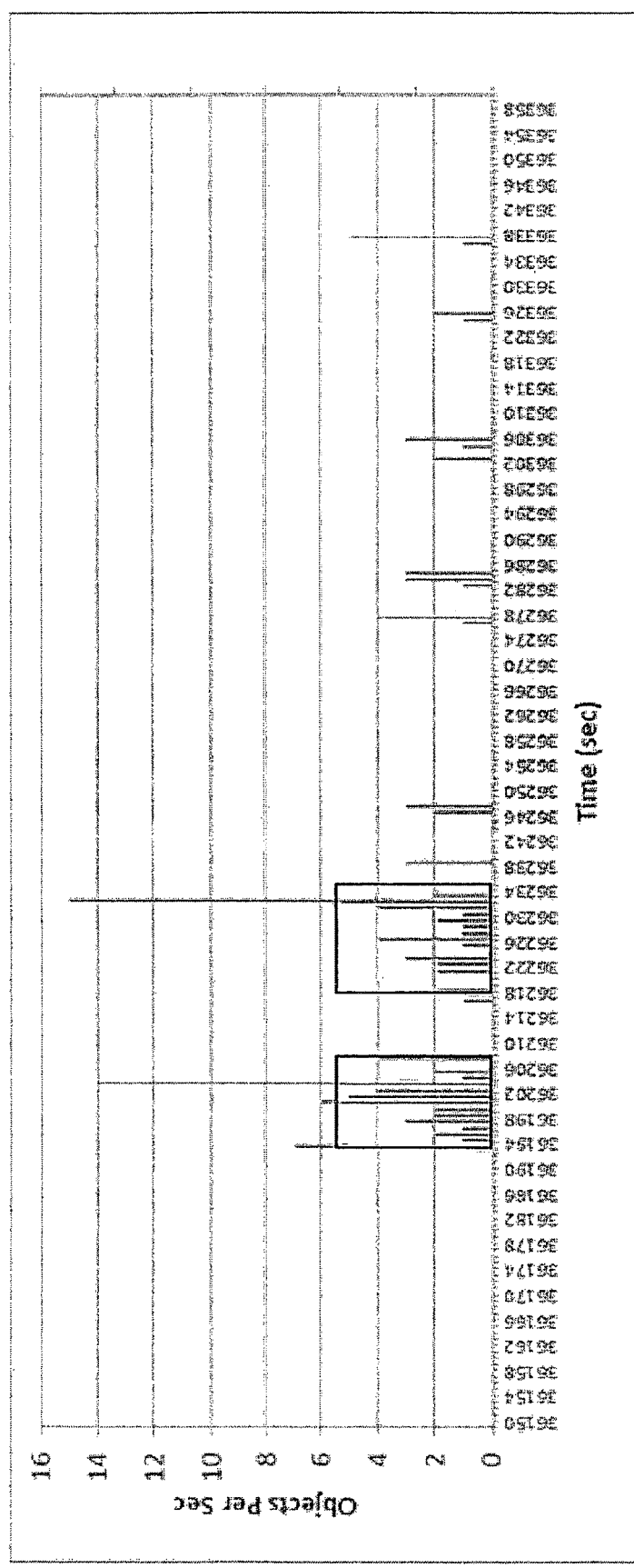
FIG. 3 shows an exemplary time series generated by the time series unit of the network server system.

The filter unit (130), which may optionally be part of the client device rather than of the network server system, is suitable for applying (230) a filter on the generated time series in order to identify one or more resource download events corresponding to the resources downloaded on the client device. Each resource download event corresponds to downloading one resource. In other words, when the client device downloads a web page via the network, wherein the network may be a mobile network, a resource download event is generated comprising data records corresponding to the objects that are part of or even compose the web page. FIG. 3 depicts two exemplary resource download events marked as two gray boxes. Thus, the filter unit (130) is optionally applicable to identify a plurality of resource download events. The filter unit (130) may further apply a median filter with kernel=5 on the time series.

The KPI determination unit (140), which may optionally be part of the client device rather than of the network server system, is applicable to determine (240) one or more resource KPIs for the resource download event. For example, one resource KPI may be the resource download duration for the resource download event. The resource download duration corresponds to the period of time that is needed in order to download the resource corresponding to the resource download event. This period of time corresponds to the time that is needed until all objects which the web page comprises are downloaded. In case a client device downloads a plurality of resources, for each of the downloaded resources a resource download duration is determined. The resource download duration may be determined by parsing the generated time series. E.g. when considering FIG. 3, the resource download duration may be determined by identifying the point in time of a beginning object corresponding to a left end of a gray box representing the resource download event, by identifying the point in time of an ending object corresponding to a right end of a gray box representing the resource download event and by calculating the duration between the beginning and the ending object.

Application of the median filter may result in a creation of groups related to continuous activity, while the remaining activity is suppressed. Suppressed activity may comprise objects with huge footprints, e.g. downloaded RAR files or streaming video files. In particular, FIG. 3 depicts suppressed objects, e.g. objects with huge footprints on a generated time series, by the objects being outside the gray boxes.

Each of these groups related to continuous activity may correspond to a resource download event, which itself corresponds to a download of a resource. In other words, each group corresponds to the downloading of one resource. Alternatively, each group may correspond to the downloading of at least two resources. In the case that a resource download event corresponds to downloading of more than one resource, the group may be de-composed into the corresponding resources using a session ID and/or an HTTP cookie comprised in corresponding data records. In other words, the data records collected for the objects that compose a resource may comprise a session ID and/or an HTTP cookie and may be utilized to identify different data records of a group.

As outlined above, collecting the data records may optionally be performed on the client device. In this case, the collecting unit (110) may be part of the client device. The client device may then transmit the collected data records to the network server system. Moreover, generating the time series of the collected data records may optionally be performed on the client device. In this case, the time series unit (120) may be part of the client device. The client device may then transmit the generated time series to the network server system. Further, applying the filter on the generated time series, as outlined above, may optionally be performed on the client device. In this case, the filter unit (130) may be part of the client device. The result of applying the filter on the time series may be then transmitted to the network server system. Optionally, determining the resource download event may be performed on the client device by the filter unit (130). The determined resource download event may then be transmitted to the network server system. Optionally, determining the resource KPIs, e.g. the resource download duration, may be performed on the client device. In this case, the KPI determination unit (140) may be part of the client device. The determined resource KPIs, e.g. the determined download event, may then be transmitted to the network server system.

Optionally, the KPI determination unit (140) is further applicable to determine any Quality of Experience (QoE or QX, respectively) metric. In particular, each QoE metric is a subjective measure of a customer's experiences with e.g. web browsing. In particular, the KPI determination unit (140) may measure metrics which a user of the client device might perceive as a quality parameter. An example for such a quality parameter might be web page/resource download duration via a mobile network. The KPI determination unit (140) may optionally be operable to perform a survey in order to determine e.g. what mix of features is necessary in order for a user of the client device to be satisfied with downloading a web page via a mobile network. Accordingly, each QoE metric may provide an assessment of human perceptions, expectations, feelings and satisfaction with respect to a particular web service or application. In one example, a QoE metric may be the resource download duration.

The correlation value determination unit (150) is applicable to determine (250) a correlation value for the resource download event. In particular, determining the correlation value for the resource download event comprises determining a correlation value for the derived resource KPIs, e.g. for the derived download duration, and a predetermined network performance metric. In one example, the client device may download a plurality of resources such that for each of the plurality of resources a resource download event and one or more corresponding resource KPIs, e.g. a resource download duration, has been determined. A correlation value may be determined for each resource KPI, e.g. for each resource download duration, of each downloaded resource and the predetermined network performance metric. A predetermined network performance metric may comprise one or more of an available uplink quality, a size of the resource download event, an available bandwidth, a download time of the resource download event, and a number of objects comprised by the resource download event. Determining and/or calculating the correlation value may further comprise performing a correlation analysis between a resource KPI, e.g. a download time duration, and one or more predetermined network metrics, also referred to as network KPIs, wherein the predetermined network metric may comprise one or more of: available uplink quality, a size of the objects comprised by a resource corresponding to a resource download event, available bandwidth at a download time of the objects of the resource corresponding to the resource download event, a number of objects comprised by the resource download event, a channel quality indicator (CQI) per class, maximum channel elements, used channel elements, maximum users per cell, average users per cell, transmitted power, received total wideband power (RTWP), GPRS average throughput, HSDPA average throughput, maximum channel elements in downlink and uplink, used channel elements in downlink and uplink, maximum users per cell and average users per cell. The size of the objects may be provided e.g. in Kbytes or Mbytes, the available bandwidth at the download time may relate to the available downlink quality and may be provided e.g. in kbits or Mbit/s.

Determining the correlation value may comprise applying standard statistical correlation formulae in order to identify correlation among any possible combination of resource KPIs and network KPIs.

One advantage of determining a correlation value between the resource KPIs, e.g. the resource download duration, and available uplink quality is that this provides for a very detailed information on possible sources of optimization. One result that was found is that there is a strong correlation between uplink quality in a mobile network. Therefore, this correlation value provides for a strong support for network engineering.

FIG. 4 shows an exemplary table comprising a plurality of correlation values determined for a particular resource.

Figure 5:
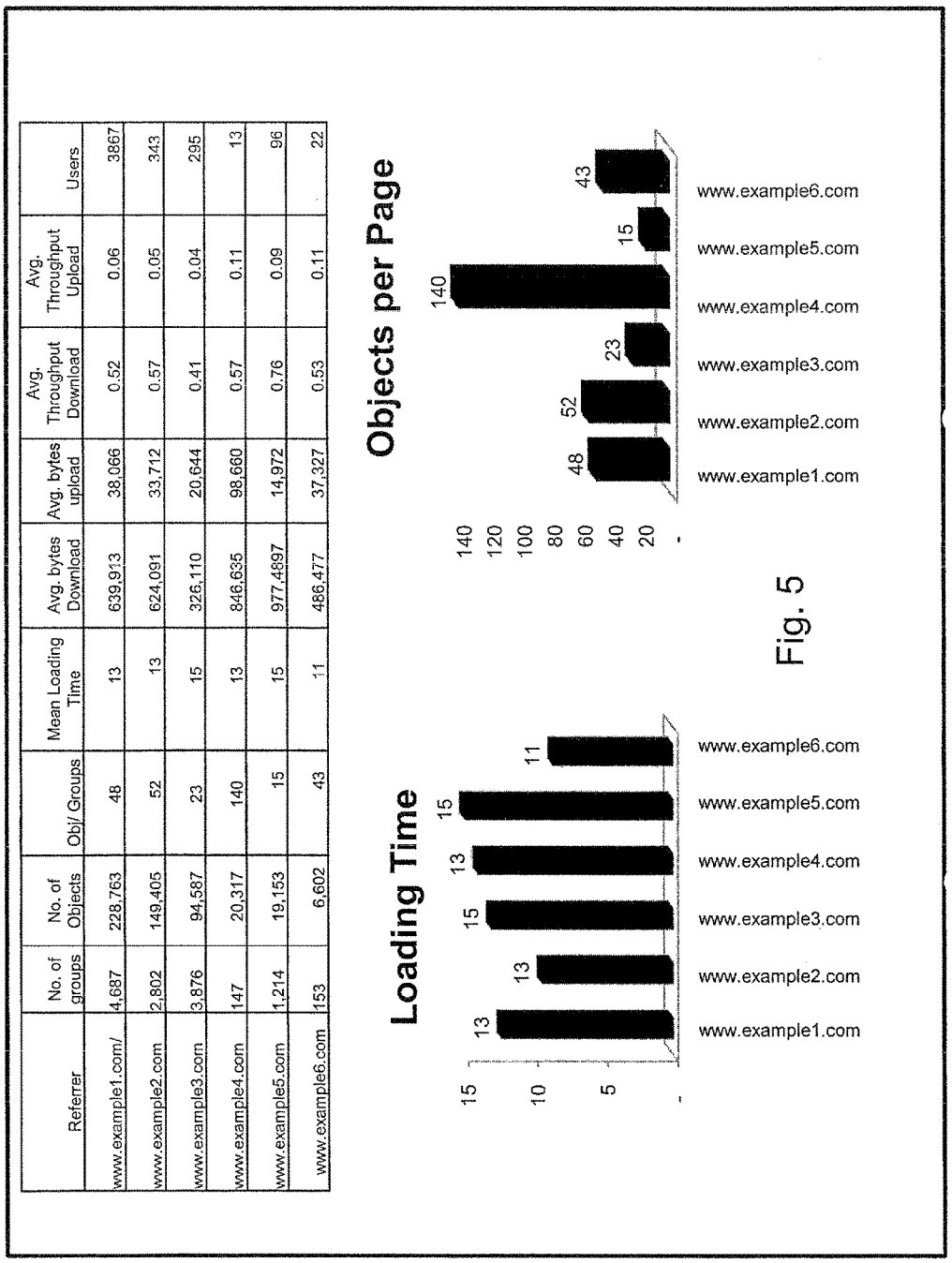
FIG. 5 shows an exemplary visualization of the loading of exemplary resource download events and the number of objects of the exemplary resource download events.

FIG. 5 shows an exemplary visualization of the loading of exemplary resource download events and the number of objects of the exemplary resource download events. Each of the depicted bars under the headline "Loading Time" relates to a resource download duration for the resource download event. Each of the depicted bars under the headline "Objects per Page" depicts the number of object per resource download event respectively per web page.

FIG. 6 shows an exemplary visualization of correlation values determined by the correlation value determination unit of the network server system as outlined above for a plurality of resource download events, wherein each row in the table corresponds to a different resource download event.

Figure 7:
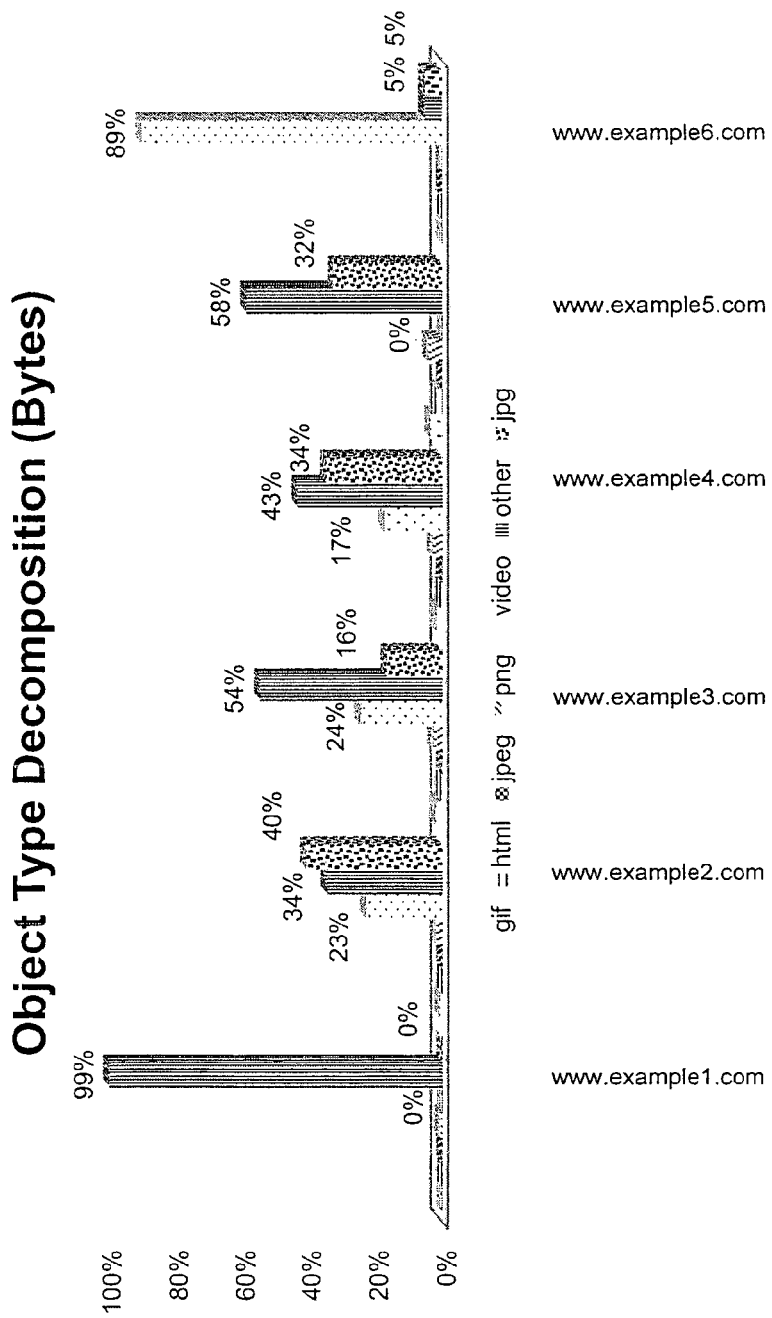
FIG. 7 shows an exemplary object type decomposition of resource download events, the object type decomposition being performed by a size of the objects (in Bytes).

FIG. 7 shows an exemplary object type decomposition. In particular, determining and/or calculating the correlation value may further comprise determining all objects of each resource being downloaded by the client device over the network, and for each resource decomposing the objects of the resource into corresponding object types based on the size of the object that may be provided in Bytes.

Figure 8:
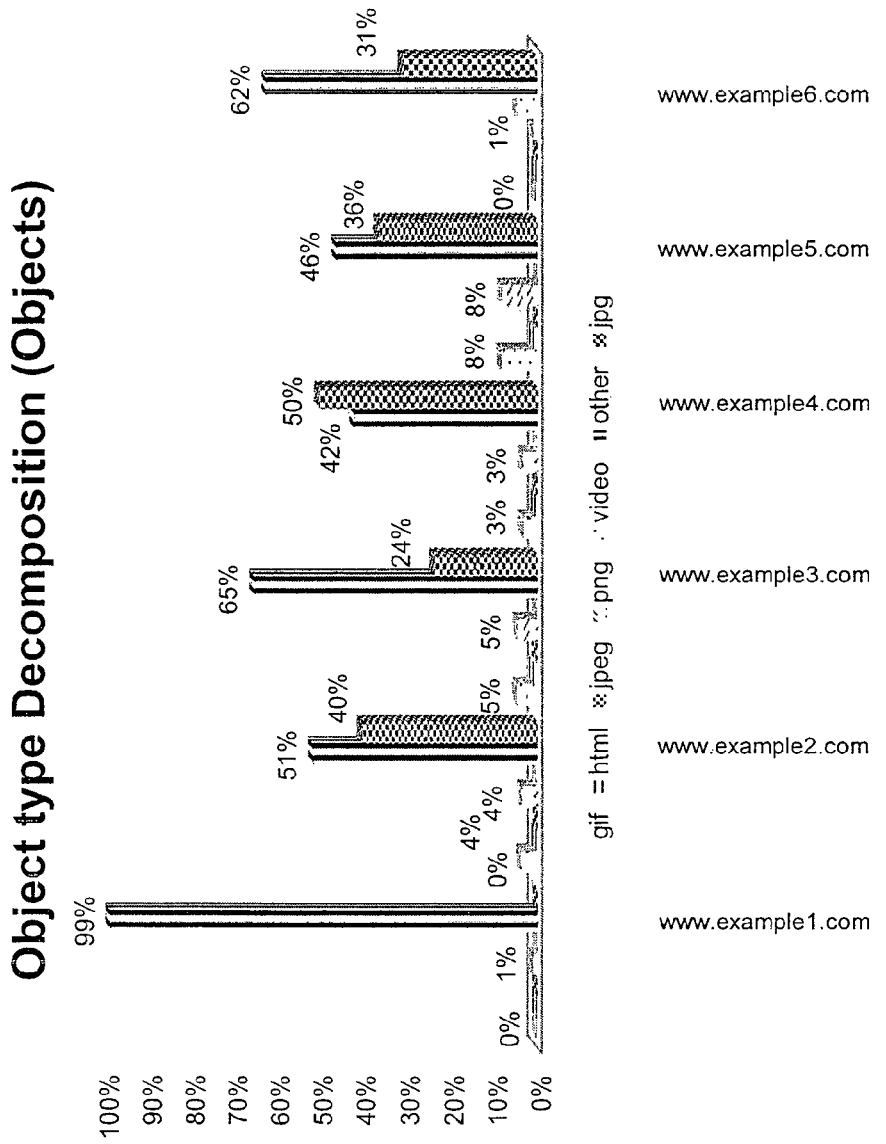
FIG. 8 shows an exemplary object type decomposition of resource download events, the object type decomposition being performed by a type of the objects.

FIG. 8 shows a further exemplary object type decomposition. In particular, determining and/or calculating the correlation value may further comprise determining all objects of each resource being downloaded by the client device over the network, and for each resource decomposing the objects of the resource into corresponding object types.

Figure 9:
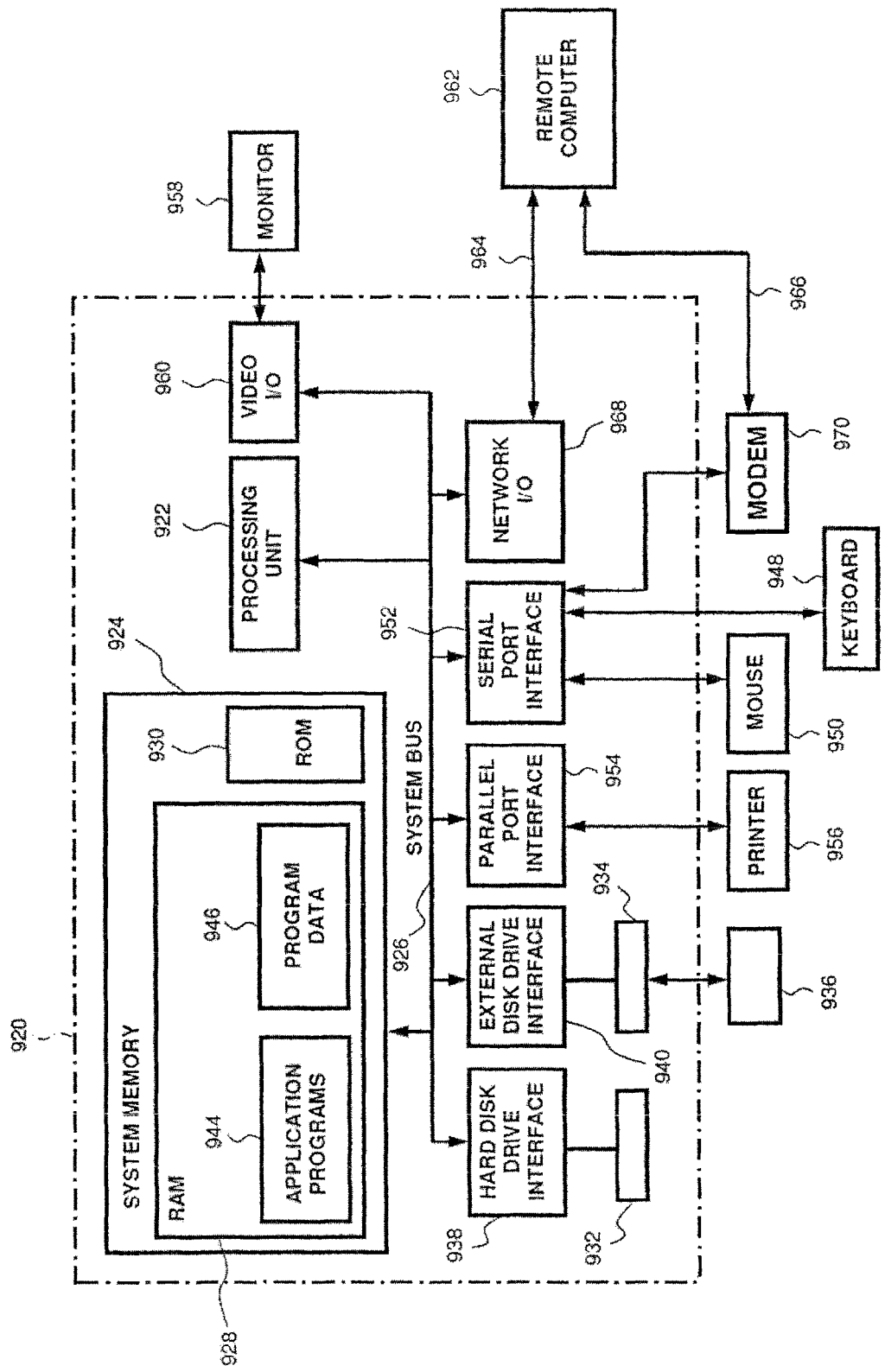
FIG. 9 shows an exemplary network server system.

FIG. 9 shows an exemplary network server system for implementing the claimed subject matter including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide non-volatile (i.e. non-transitory) storage of computer readable instructions, data structures, program modules and other data for the personal computer 920. The data structures may include relevant data for the implementation of the method for optimizing a resource to be downloaded by a client device via a network as outlined above. The relevant data may be organized in a database, for example a relational or object database.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 5.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 6 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 6 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the network server system (100) described above may be resident on or accessible via the remote computer 962. It will be appreciated that the network connections shown are exemplary and other means of establishing a communications link between the electronic devices may be used.

The above-described computing system is only one example of the type of network server system that may be used to implement the method for optimizing a resource to be downloaded by a client device via a network as described above. As mentioned above, one or more aspects of the network server system described above may be implemented on a client device, such as a mobile phone, handheld computer, smartphone, embedded computer, tablet, personal computer, or wearable computer, the client device comprising a conventional computing environment 920 described above.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are disclosed in this specification, these combinations are not intended to limit the disclosure of possible implementations. In fact, many of these features may be combined in ways not specifically recited in the claims and/or disclosed in the specification.

No element, act, or instruction used herein should be construed as critical or essential unless explicitly described as such. Also, as used herein, the articles "a" and "an" are intended to include one or more items, and may be used interchangeably with "one or more."

The invention claimed is:

1. A system comprising:
one or more devices to:
collect a plurality of data records that relate to a resource downloaded by a client device;
generate a time series of the plurality of data records;
apply a filter on the time series to identify a resource download event that corresponds to downloading the resource;
determine a resource key performance indicator (KPI) for the resource download event;
determine a correlation value for the resource KPI and a network performance metric; and
enable an optimization of the resource based on the correlation value.

2. The system of claim 1, wherein the resource is downloaded by the client device via a mobile network.

3. The system of claim 1, wherein the one or more devices, when enabling the optimization of the resource, are to:
determine that the resource can be optimized based on the correlation value, and
enable the optimization of the resource based on determining that the resource can be optimized.

4. The system of claim 1, wherein the network performance metric comprises at least one network KPI.

5. The system of claim 4, wherein the at least one network KPI comprises one or more of:
quality information,
size information associated with objects included in the resource,
an available bandwidth at a download time of the objects, or
a quantity of the objects.

6. The system of claim 1,
wherein the resource KPI comprises information associated with a download duration, and
wherein the one or more devices, when determining the correlation value, are to:
perform the correlation value by performing a correlation analysis between the download duration and one or more parameters, and
wherein the one or more parameters comprise one or more of:
available uplink quality,
a size of the resource download event,
available bandwidth at a download time of the resource download event, or
a quantity of objects included in the resource.

7. The system of claim 1, wherein the resource is a web page.

8. The system of claim 1, wherein the resource comprises an object that relates to one of:
a layout of the resource comprising:
Cascading Style Sheets (CSS),
modules, or
templates, or
a content of the resource comprising:
images of different formats,
videos of different format, or
text of different formats.

9. The system of claim 1, wherein the resource download event comprises downloading all objects of the resource.

10. The system of claim 1, wherein a data record, of the plurality of data records, comprises one or more of:
a download time of an object of the resource,
an object type definition of the object,
a uniform resource identifier (URI) invoked by the client device for initiating the resource download event, or
identification information of the client device.

11. The system of claim 1, wherein the one or more devices are to:
exclude one or more data records, with missing identification information, from the plurality of data records; and
remove prefix information from a URI field of another data record of the plurality of records.

12. The system of claim 1, wherein the one or more devices, when generating the time series, are to:
record, for a unit of time, a quantity of objects, of the resource, downloaded by the client device, and
generate the time series based on recording, for the unit of time, the quantity of objects.

13. The system of claim 1, wherein the filter comprises a median filter with kernel=5.

14. A method comprising:
collecting, by one or more devices, a plurality of data records that relate to a resource downloaded by a client device;
generating, by the one or more devices, a time series of the plurality of data records;
applying, by the one or more devices, a filter on the time series to identify a resource download event that corresponds to downloading the resource;
determining, by the one or more devices, a resource key performance indicator (KPI) for the resource download event;
determining, by the one or more devices, a correlation value for the resource KPI and a network performance metric; and
performing, by the one or more devices and based on the correlation value, an optimization of the resource.

15. The method of claim 14, further comprising:
performing data cleansing of the plurality of data records.

16. The method of claim 14, wherein generating the time series comprises:
generating the time series based on recording, for a unit of time, a quantity of objects, of the resource, downloaded by the client device.

17. The method of claim 14, where the resource KPI includes information identifying a period of time that is needed to download all objects of the resource.

18. A non-transitory computer readable medium storing instructions, the instructions comprising:
one or more instructions that, when executed by at least one computer, cause the at least one computer to:
receive one or more data records related to one or more objects, of a resource, downloaded by a client device;
generate a time series of the one or more data records;
identify, based on the time series, a resource download event that corresponds to downloading the resource;

determine a resource key performance indicator (KPI) for the resource download event;

determine a correlation value based on the resource KPI; and enable an optimization of the resource based on the correlation value.

19. The non-transitory computer readable medium of claim 18, where the one or more instructions to identify the resource download event comprise:

one or more instructions that, when executed by the at least one computer, cause the at least one computer to:

apply a filter to the time series, and identify the resource download event based on applying the filter to the time series.

20. The non-transitory computer readable medium of claim 18, where the one or more instructions to determine the correlation value comprise:

one or more instructions that, when executed by the at least one computer, cause the at least one computer to:

perform a correlation analysis between the resource KPI and one or more network metrics, and determine the correlation value based on performing the correlation analysis.

\* \* \* \* \*